Patented Feb. 11, 1941

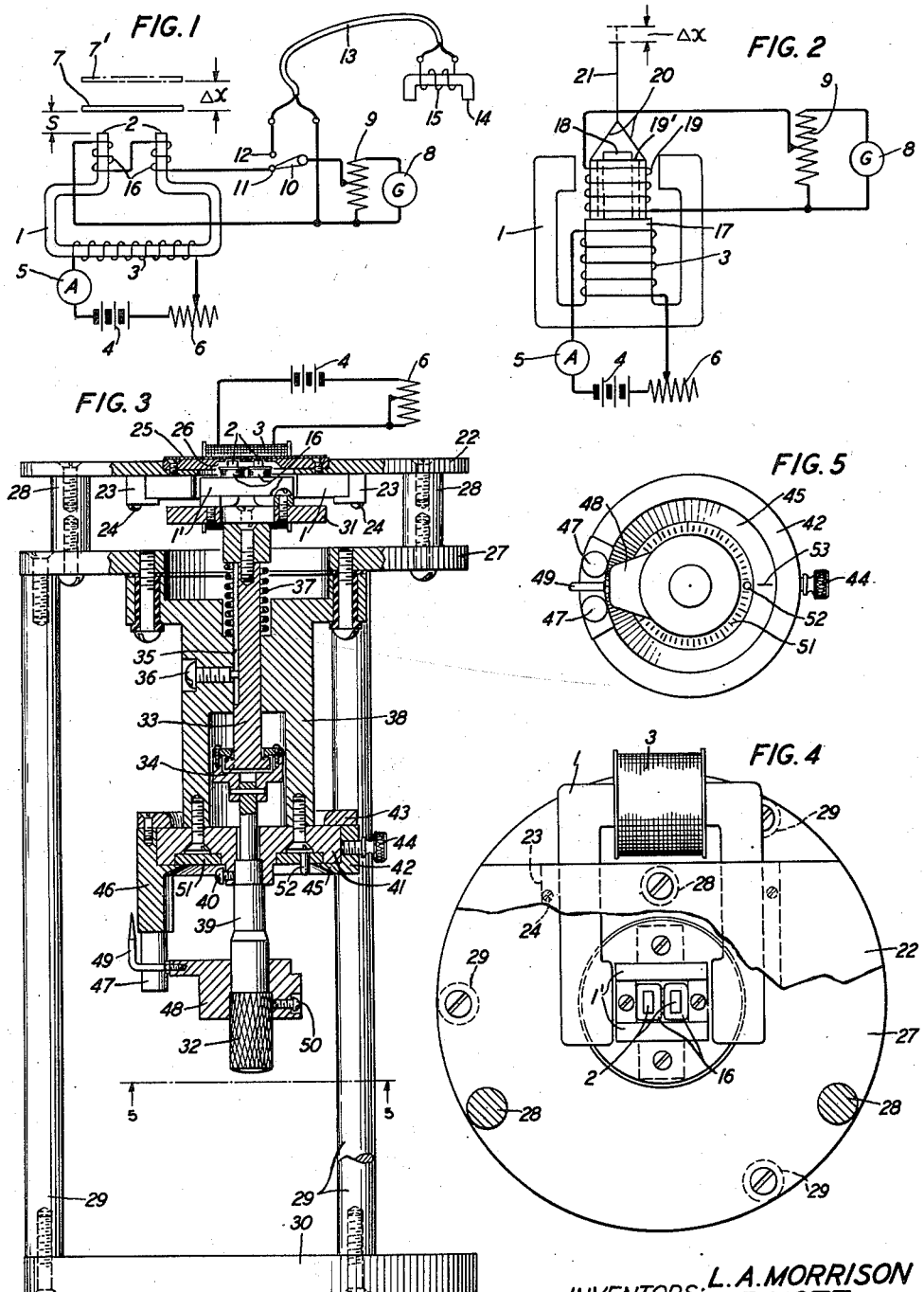

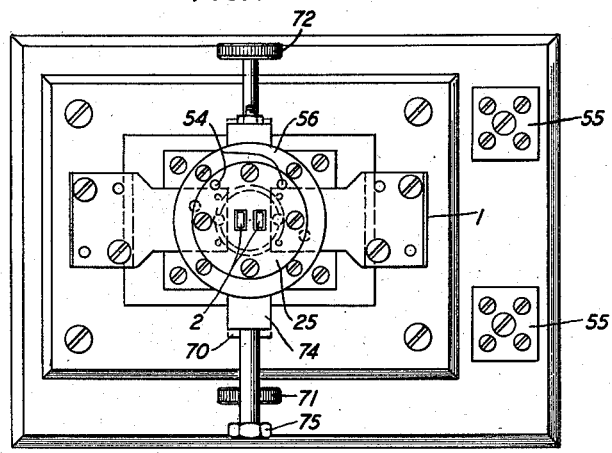
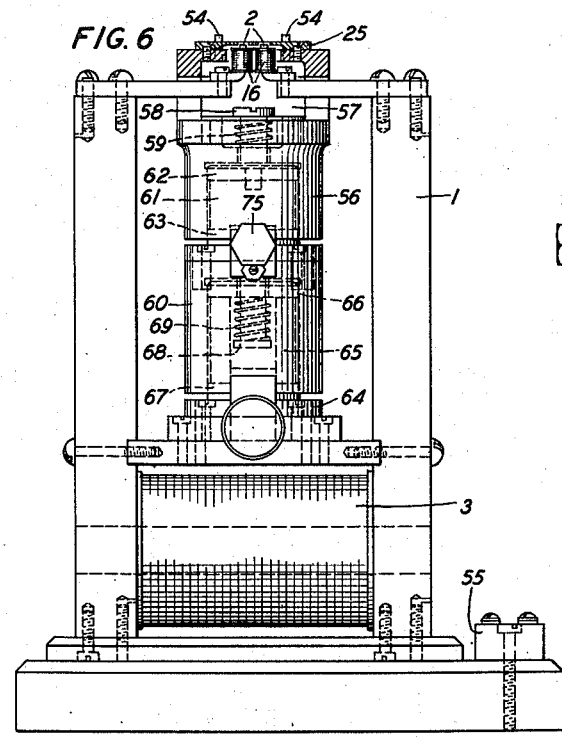
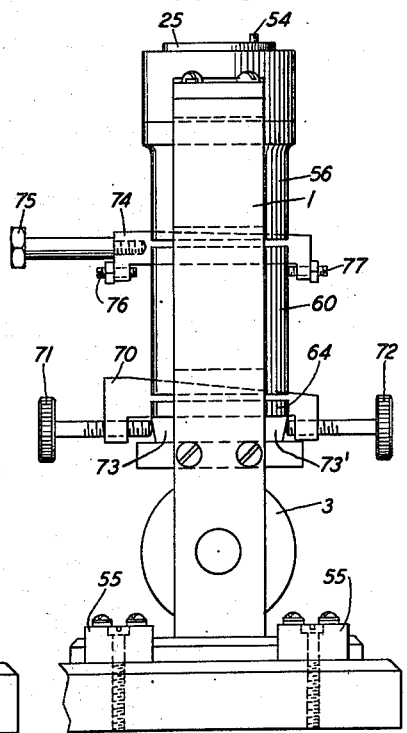

2,231,085

UNITED STATES PATENT OFFICE 2,231,085

METHOD AND APPARATUS FOR MEASURING FORCE FACTORS

Louis A. Morrison, Madison, and Edward E. Mott, Upper Montclair, N. J., assignors to Bell Telephone Laboratories, Incorporated, New York, N. Y., a corporation of New York Application June 3, 1939, Serial No. 277,128

11 Claims. (Cl. 179—175)

This invention relates to a method of and apparatus for measuring the force factors of electromechanical systems.

This application is a continuation in part of applicants' copending applications, Serial Nos. 93,792 and 161,936, filed August 1, 1936 and September 1, 1937, respectively.

Investigations and routine tests of the efficiencies of electromechanical systems have made it desirable to adopt a common factor in order to properly and accurately compare systems of different designs. A convenient common factor for electromechanical systems is the figure of merit. By way of a specific illustration the figure of merit for electroacoustic transducers may be expressed as $$\delta = \frac{KA}{\sqrt{Z}} \left( \frac{G}{M} \right) \text{ (for constant amplitude devices)} \quad (1)$$

$$\delta = \frac{CA}{\sqrt{Z}} \left( \frac{G}{\sqrt{M}} \right) \text{ (for constant velocity devices)} \quad (1a)$$

where:
$\delta$ = figure of merit
K and C = constants
A = effective area of acoustic radiator
G = force factor
M = effective mass of moving system
Z = damped electrical impedance of transducer.

From the above expression it will be noted that for systems for the same general purpose, for example, cone type loud-speakers or telephone receivers, the expressions $$\frac{KA}{\sqrt{Z}} \text{ or } \frac{CA}{\sqrt{Z}}$$

may ordinarily be regarded as constants and hence the ratio $$\frac{G}{M} \text{ or } \frac{G}{\sqrt{M}}$$

becomes a reasonably accurate measure of merit.

It is the object of this invention to provide a method and means whereby the force factor of any electromechanical system may be quickly and accurately measured.

The foregoing object is attained by the method and apparatus of this invention which comprises producing a relative displacement of a known amount between the movable and stationary members of the electromechanical system and measuring the flow of electric charge produced thereby.

The force factor may be expressed mathematically as:

$$G = \frac{F}{i} = \frac{e}{v} = \frac{\delta(n\Phi)}{\delta x} = \text{approximately } \frac{\Delta(n\Phi)}{\Delta x} \quad (2)$$

where:
G = force factor (dynes/abampere)
F = instantaneous force in dynes
$i$ = instantaneous current in abamperes
$e$ = instantaneous voltage
$v$ = instantaneous velocity in centimeters/second
$\Delta(n\Phi)$ = incremental change in total flux linkages
$\Delta x$ = incremental displacement of movable system.

In the foregoing expression if $\Delta(n\Phi)$ and $\Delta x$ are made very small their ratio approaches $$\frac{\delta(n\Phi)}{\delta x}$$

as is well known. In this invention a carefully controlled incremental displacement is made use of to yield an accurately measured value of the force factor as will appear from the more detailed description which is to follow taken in connection with the accompanying drawings in which:

Fig. 1 discloses the fundamental features of one application of the invention to the measurement of the force factor of an electromagnet and armature;

Fig. 2 shows the invention applied to a moving coil type system;

Fig. 3 is a specific practical embodiment of the invention applied to telephone receiver diaphragms wherein the incremental displacement is effected by shifting the magnet with respect to the diaphragm;

Fig. 4 is a top view of a partial section of Fig. 3;

Fig. 5 is a bottom view of the control knob as seen from section 5—5 of Fig. 3; and Figs. 6, 7 and 8 are three views of a different specific embodiment also for testing telephone receiver diaphragms wherein the incremental displacement is effected by shifting the receiver diaphragm.

Returning to Fig. 1, an electromagnet I which may be of any convenient or suitable shape is adapted to magnetically cooperate with an armature 7 also of any suitable shape. The space or gap S between the armature 7 and magnet I represents the relative position at which it is desired to measure the force factor G. If the diaphragm 7 be suddenly moved either toward or away from the magnet I a distance $\Delta x$, for example to dotted position 7', there will be a corresponding change in flux linkages due to the change in reluctance of the magnetic circuit. It will be understood that the increment Δx as shown is greatly exaggerated and is actually a relatively small distance, for example ½ to 1 mil.

A coil 3 is wound on a portion of magnet 1 and receives current from battery 4 to generate the necessary magnetomotive force. An ammeter 5 and rheostat 6 provide easy control. A coil 16 is mounted on each of the poles 2 and the current induced therein is a measure of the change of flux linkages Δ(nΦ). Coils 16 are serially connected to ballistic galvanometer 8 through a suitable shunt 9 and switch 10 when the latter is connected to contact 11.

Switch 10 may also be connected to contact 12 whereby a portable search coil 15 is connected to galvanometer 8 through the flexible two-conductor lead 13. A suitable magnetic core 14 is provided for coil 15. This coil is used to adjust the initial distance S as will be explained more in detail later.

In Fig. 2 the electromagnet 1 is shown schematically in the form of an E instead of the U of Fig. 1. This form is selected here because it provides a working gap essentially like that of the field of a moving coil dynamic loud-speaker and is therefore especially convenient for measuring the force factors of moving coil systems. The center leg 18 of the E is shown as having an enlarged section 17 of suitable length to limit the initial position of the movable coil 19. This, of course, is not the only way the initial position can be limited and in actual practice leg 18 may be of uniform diameter and carry an adjustable stop for limiting the initial position of the coil in a manner analogous to those hereinafter more particularly disclosed in Figs. 3 and 8 for telephone receiver diaphragms. Coil 19 is usually wound on a hollow support 19' and in the case of most loud-speakers this is a light fiber form to be attached to the core or diaphragm. In this embodiment coil 19 acts in a manner analogous to coils 16 of Fig. 1. Coil 3, battery 4, ammeter 5, rheostat 6, galvanometer 8 and shunt 9 are as in Fig. 1. The coil mounting means schematically represented herein as wires 20 and 21 are adapted to transmit to coil 19 an incremental displacement Δx.

Figs. 3 and 4 disclose a particular practical embodiment of the mechanical features of Fig. 1 adapted for a telephone receiver diaphragm. In this embodiment the incremental displacements are effected by moving the magnet poles 2 with respect to the diaphragm which is kept stationary. In order to reduce the mass to be moved, the electromagnet 1 is divided into parts 1 and 1'. The U-shaped part 1 is an electromagnet with energizing coil 3 while the two bar-shaped parts 1' constitute two parallel mounted permanent magnets of high retentivity terminating in soft iron poles 2. This latter structure is essentially that used in telephone receivers more particularly disclosed in Fig. 6 of either of applicants' copending applications, Serial No. 93,792 or 161,936.

Electromagnet 1 is slidably supported in a pair of slides 23, 23 under a horizontal supporting plate 22 of non-magnetic material, preferably brass. Slides 23, 23 may be attached to plate 22 by means of screws 24. When the electromagnet 1 is slid into the position indicated in Fig. 4 its poles are closely adjacent the ends of permanent magnets 1'. The magnetism retained by magnets 1' is then under the control of electromagnet 1 by adjusting rheostat 6 shown in Fig. 3 which controls the current taken by coil 3 from source 4. After having changed or adjusted the magnetism of magnets 1', electromagnet 1 may be slid out of their magnetic path or removed entirely from slides 23, 23.

Near the center of plate 22 there is mounted a non-magnetic diaphragm support 25 having two rectangular clearance holes indexing with the ends of poles 2. Clearance space 26 is provided on the under-side of support 25 for the upper ends of coil 16 and its top surface is carefully machined so it is in the same plane as the top faces of poles 2 when the latter are raised.

Plate 22 is fixed to the top of a second plate 27 by means of three short posts 28. Plate 27 is in turn rigidly supported by three long posts 29 fixed to a base 30.

Magnets 1' with their poles 2 and coils 16 are mounted on a flange 31 which is movable in a vertical direction by micrometer 32 through rod 33. A slidable joint 34 permits rotation of micrometer 32 while rod 33 is prevented from rotation by a keyway 35 and screw 36. A spring 37 urges flange 31 upwardly to remove any backlash or looseness in joint 34 or the threads in micrometer 32. Rod 33 is given a close sliding fit in a hole bored vertically through a column 38 which is rigidly mounted on the under-side of plate 27.

Micrometer 32 is of conventional design with the stationary part 39 held rigidly in the hub of a supporting disc 41 by means of set screw 40. Disc 41 is rigidly attached to the underside of column 38 and around its periphery a rotatable measuring ring 42 is mounted so as to have a close sliding fit. Ring 42 is retained by a collar 43 as indicated and a knurled thumb screw 44 is provided to adjustably fix its position. A downwardly disposed extension 46 integral with ring 42 carries two parallel rods 47, better shown in Fig. 5, which together with arm 49 act as stops to restrict the angular rotation of micrometer 32 to a small angle. Arm 49 is secured to micrometer 32 through a knob 48 and set screw 50. The effect of this small angular rotation is to provide a fixed small incremental displacement of known magnitude for the magnets 1' and their poles 2.

In making studies over wide ranges of initial air-gaps it is helpful to use an auxiliary scale which is more easily read. This auxiliary scale is engraved on a separate annulus 51 frictionally mounted within disc 41 and movable by a pin 52. A reference index 53 is engraved on a beveled portion 45 of ring 42. Each scale division of scale 51 may represent 1 mil or other suitable small unit of measure. In using the auxiliary scale thumb screw 44 is loosened and measuring ring 42 is rotated the desired number of revolutions or fractions thereof as measured by scale 51, after which screw 44 is tightened. Annulus 51 may then be slid around until pin 52 is again opposite the reference index 53. Of course, the usual scale on the barrel of micrometer 32 could be used for this same purpose, but it is not quite so convenient.

Connections to the coils 16 are as shown in Fig. 1 and have been deleted from Fig. 3 for clarity. A portable search coil 15 and switch 10 may also be provided.

To prepare this apparatus for measuring the force factor of a telephone receiver diaphragm operating under various magnetic intensities and varying air-gaps, it is first necessary to accurately establish an initial air-gap S as shown in Fig. 1. This is most conveniently accomplished by an indirect magnetic measurement employing a portable search coil, such as coil 15 of Fig. 1. The poles of core 14 are made with the same pitch as poles 2 so that when core 14 is placed on poles 2 they form a completed magnetic circuit with negligible air-gap. Poles 2 are raised flush with or slightly protruding through diaphragm support 25 and a non-magnetic material such as phenol fiber of accurately measured thickness is inserted between core 14 and poles 2. Magnets 1' are given any convenient magnetization by means of electromagnet 1 after which electromagnet 1 is withdrawn from their fields. The thickness of the phenol fiber spacer between poles 2 and core 14 is preferably substantially equal to the normal working gap for the diaphragm to be tested. Switch 10 is connected to contact 12. Search coil 15 and its core 14 are quickly withdrawn and the resulting ballistic deflection of galvanometer 8 is noted.

Screw 44 is then released and poles 2 are lowered by rotating ring 42. With the spacers removed the above-described ballistic reading is repeated until the deflection is the same as before whereupon the gap S is equal to the non-magnetic spacer thickness. Screw 44 is thereupon tightened. Although the initial gap S has been adjusted by the above-described indirect magnetic means, it is obvious that other well-known direct means may be used such as depth gauges commonly used by machinists.

After the above adjustment of initial gap has been made it is apparent that any other initial gap distance may be obtained by loosening nut 44 and rotating ring 42 the desired amount according to the auxiliary scale 51.

For any initial gap setting the change of flux linkages $\Delta(n\Phi)$ may be measured by turning switch 10 to contact 11, swinging micrometer 32 once through the restricted arc determined by posts 47 and arm 49 and noting the ballistic response of galvanometer 8. From the readings thus obtained and the calibration of the galvanometer and coil circuit employing a mutual inductance standard in a well-known manner, the value of $\Delta(n\Phi)$ is obtained. Mathematically the value of $\Delta(n\Phi)$ is:

$$\Delta(n\Phi) = 2(10)^8 MID_T/D_C \quad (3)$$

where:
M is mutual inductance in henries
I is calibrating current in amperes
$D_T$ is ballistic deflection for test
$D_C$ is ballistic deflection for calibration.

The force factor is then determined from Equation 2 and the figure of merit as an acoustic radiator from Equation 1. In the latter equation the mass M is the mass of the diaphragm since that is the moving system even though the magnet structure was actually moved during the test.

It is evident from the foregoing that the force factor may be measured for varying magnetic intensities by changing the retained magnetism of magnet 1'.

Figs. 6, 7 and 8 disclose a device which, although quite different mechanically, is identical in principle to the one disclosed in Figs. 3, 4 and 5. In this embodiment the diaphragm is displaced instead of the magnet and pole-pieces as in Fig. 3 and the displacement is effected by means of wedges 70 and 74 instead of by a micrometer.

The diaphragm support 25 is here supported by the cylinder 56 having a cavity 57 in its top end to receive coils 16 and poles 2 of electromagnet 1. The fact that the magnetic circuit is made up from a plurality of parts bolted together is of no functional significance except that it provides easy assembly. The two pins 54 are for accurately centering the diaphragms over poles 2.

The under-part of cylinder 56 is accurately bored out to take a cylindrical reduced shaft 61 extending upwardly from cylinder 60. Shaft 61 is accurately machined at raised points 62 and 63 to provide a close sliding fit with the bore in cylinder 56. A screw 58 is threaded into the top of shaft 61 and with spring 59 provides positive sliding contact between cylinder 56 and wedge 74.

A horizontal slot is cut through cylinder 60 to take wedge 74 as shown in Fig. 8. A cut-away bottom portion of cylinder 56 rests on wedge 74 so that as wedge 74 is slid back by pushing on handle 75, cylinder 56 is raised a small increment. This provides the necessary incremental displacement $\Delta x$. Set screws 76 and 77 provide accurate adjustment of the magnitude of $\Delta x$.

The bottom of cylinder 60 is also bored out to take a cylindrical reduced shaft 65 and has accurately fitted surfaces 66 and 67 similar to surfaces 62 and 63. Spring 69 is similar to spring 59 and screw 68 is threaded into cylinder 60. Shaft 65 is integral with cylinder 64 which, in turn, is secured to the legs of electromagnet 1 as shown in Fig. 6.

Wedge 70 is inserted through a slot in cylinder 64 and provides easy adjustment for the initial gap S which may be varied by adjusting opposing screws 71 and 72. The wedge-shaped recesses 73, 73' are cut in cylinder 64 to insure that turning screws 71 and 72 will not raise wedge 70.

It is evident from the foregoing descriptions that an electric charge is caused to flow in the circuit of coils 16 whenever there is a relative displacement between either the diaphragm 7 and poles 2 in Fig. 1 or the coil 19 and the poles of electromagnet 1 in Fig. 2 and that this flow is measured by the change of flux linkages $\Delta(n\Phi)$ in coils 16.

To measure the force factors of other electromagnetic systems, for example relays or magnetic switches, it is only necessary to adapt the dimensions and shapes of the various parts of either Fig. 3 or Fig. 8 to the particular device which it is desired to test. The manner of doing this is obvious to any one skilled in the art. In the particular case of magnetic switches, the electromagnet 1 of Fig. 1 may be field magnet of the switch and the armature 7 will, of course, be the switch armature.

It is to be noted that although for each of the specific embodiments herein disclosed the displacement $\Delta x$ is adjustable in magnitude, yet for practical measurements this displacement is kept constant. Hence, according to Equations 2 and 3 it is evident that the force factor G is measured directly by the deflection $D_T$ in the practical apparatus.

What is claimed is:
1. A method of measuring the force factor of an electromechanical system having a normally movable and a normally stationary member comprising moving the normally movable member of said system through a unidirectional single transit of known amount with respect to the nor- mally stationary member of said system, and measuring the flow in electric charge produced by said movement.

2. A method of measuring the force factor of an electromechanical system having a normally movable and a normally stationary member comprising displacing the normally stationary member through a unidirectional single transit of known amount with respect to the normally movable member of said system, and measuring the flow in electric charge produced by said displacement.

3. A method of measuring the force factor of an electromechanical system having a normally movable and a normally stationary member comprising effecting a single unidirectional relative displacement of known magnitude between said two members, and measuring the resultant flow of electric charge.

4. A device for measuring the force factor of an electromechanical system having a normally movable and a normally stationary member comprising means for mechanically displacing one of said members through a unidirectional single transit of known amount relative to the other, electrical means associated with said system adapted to transform the change in mechanical energy resulting from said displacement into an equivalent flow of electric charge, and measuring means for measuring said flow of electric charge.

5. A device for measuring the force factor of an electromechanical system having a normally movable and a normally stationary member comprising means for mechanically displacing said normally movable member through a unidirectional single transit of known amount with respect to said normally stationary member, electrical means associated with said system adapted to transform the change in mechanical energy resulting from said displacement into an equivalent flow of electric charge, and measuring means for measuring said flow of electric charge.

6. A device for measuring the force factor of an electromechanical system having a normally movable and a normally stationary member comprising means for mechanically displacing said normally stationary member through a unidirectional single transit of known amount with respect to said normally movable member, electrical means associated with said system adapted to transform the change in mechanical energy resulting from said displacement into an equivalent flow of electric charge, and measuring means for measuring said flow of electric charge.

7. A device for measuring the force factor of a telephone receiver diaphragm movable in a given magnetic circuit, means for producing a constant magnetomotive force in said magnetic circuit, displacing means operatively engaging said diaphragm and adapted to move it a known distance thereby changing the reluctance of said magnetic circuit, a coil associated with said magnetic circuit responsive to the change of flux linkages produced by said reluctance change, and a measuring means cooperating with said coil to quantitatively indicate the said change of flux linkages.

8. A device for measuring the force factor of a telephone receiver diaphragm comprising a magnetic circuit including said diaphragm as a part thereof, means for producing a magnetomotive force in said magnetic circuit, means for mechanically displacing said diaphragm a small distance with respect to the rest of the magnetic circuit whereby the reluctance of the magnetic circuit is changed, electrical means associated with said magnetic circuit responsive to the change in flux resulting from said reluctance change, and a measuring means cooperating with said electrical means to quantitatively indicate the said change in flux.

9. A device for measuring the force factor of an electroacoustic transducer comprising a magnetic circuit, means for producing a magnetomotive force in said circuit, a movable driving element for said transducer, means for accurately positioning said driving element within the field of said magnetic circuit, mechanical displacing means adapted to effect a small known relative displacement between said driving element and said magnetic circuit whereby a flow of electric charge is produced, and means for measuring the flow of electric charge.

10. A device for measuring the force factor of an electroacoustic transducer, a coil for driving the acoustic radiator of said transducer, a magnetic circuit, means for producing a magnetomotive force in said circuit, means for accurately positioning said coil within the field of said circuit, mechanical displacing means adapted to effect an incremental relative displacement between said driving coil and said magnetic circuit thereby changing the flux linkages in said coil, and means for quantitatively indicating the said change in flux linkages.

11. A device for measuring the force factor of an electromechanical system having a normally movable and a normally stationary member comprising a magnetic circuit, means for producing a magnetomotive force in said circuit, means for adjusting the magnitude of said magnetomotive force, means for accurately positioning said movable member with respect to said stationary member and within the field of said circuit, an electric coil linking said magnetic circuit, a mechanical displacing means adapted to effect an incremental relative displacement between said two members thereby changing the flux linking said coil, and means for quantitatively indicating said change in flux linkages.

LOUIS A. MORRISON.
EDWARD E. MOTT.